United States Patent [19]
Birchler et al.

[11] Patent Number: 5,929,806
[45] Date of Patent: Jul. 27, 1999

[54] METHOD FOR ESTIMATING A LOCATION OF A MOBILE UNIT BASED ON AT LEAST TWO FIXED TRANSCEIVERS

[75] Inventors: Mark A. Birchler, Roselle; Debra A. Jones; Nicholas C. Oros, both of Schaumburg, all of Ill.

[73] Assignee: Motorola, Inc., Schaumburg, Ill.

[21] Appl. No.: 08/846,751

[22] Filed: Apr. 30, 1997

[51] Int. Cl.⁶ .............................. G01S 5/02; H04B 7/185
[52] U.S. Cl. .......................................... 342/357; 701/213
[58] Field of Search ................................... 342/357, 457; 701/213

[56] References Cited

U.S. PATENT DOCUMENTS

| | | |
|---|---|---|
| 5,202,829 | 4/1993 | Geier . |
| 5,416,712 | 5/1995 | Geier et al. . |
| 5,436,632 | 7/1995 | Sheynblat . |
| 5,525,998 | 6/1996 | Geier . |
| 5,736,960 | 4/1998 | Murphy et al. ......................... 342/357 |

*Primary Examiner*—Mark Hellner
*Attorney, Agent, or Firm*—Kenneth A. Haas

[57] ABSTRACT

Signals comprising time of transmission indications relative to a common time base (302) are transmitted by at least two fixed transceivers (110–116). When the signals are received by a mobile unit (160), a time of reception indication relative to the common time base is calculated for each signal. Pseudo-ranges are calculated based on the time of transmission and time of reception indications, and a WLS solution location estimate is calculated based on the pseudo-ranges. Essentially the same procedure may be performed on signals transmitted by the mobile unit. Given the common time base between the fixed transceivers and the mobile unit, only two or more signals are required to determine the location estimate. Where GPS receivers are used to supply the common time base, location determinations can still be made when a GPS solution is unavailable.

15 Claims, 3 Drawing Sheets

METHOD FOR ESTIMATING A LOCATION OF A MOBILE UNIT BASED ON AT LEAST TWO FIXED TRANSCEIVERS

FIELD OF THE INVENTION

The present invention relates generally to location determination in wireless communication systems and, in particular, to a method for estimating a location based on at least two fixed transceivers.

BACKGROUND OF THE INVENTION

Wireless communication systems are known in which mobile units (e.g., in-car mobile or in-hand portable radios) wirelessly communicate with a fixed communication infrastructure comprising a plurality of geographically-diverse transceivers. In such systems, methods for determining location information for a given mobile unit are known. In particular, the well-known weighted least squares (WLS) solution can be used to determine location information as shown, for example, in U.S. Pat. No. 5,416,712 issued to Geier et al.

Succinctly stated, the WLS approach to location determination attempts to iteratively derive a location estimate for a mobile unit based, in part, on distance estimates between the mobile unit and fixed transmitters having known locations. Given that distance can be calculated as the product of velocity and time, the distance estimates (referred to as pseudo-ranges or PRs) are calculated in practice by multiplying the propagation delays between the mobile unit and fixed transmitters with the speed of light. Assuming ideally measured propagation delays, the location of the mobile unit can be calculated using the pseudo-ranges with little or no error. However, propagation delays are measured in practice using transmitted signals, which signals are subject to the effects of various error sources, e.g., noise, multipath interference, distortion, etc. The resultant errors in the delay measurements are translated into errors in the pseudo-ranges and, consequently, into error in the location estimate. In order to combat the presence of measurement errors, the WLS solution factors the reliability of the various measurements into the location estimation.

Generally, location determinations in three-dimensional space require the reception of signals transmitted by at least four fixed transmitters. For example, in the well-known Global Positioning System (GPS), the receiving unit (i.e., the unit for which a location is to be determined) does not maintain a timing reference exactly synchronized to the highly stable and synchronized timing references maintained by the transmitting satellites. As a result, the pseudo-ranges determined by the receiving unit will not result in a precise location solution. In order to combat this, a fourth measurement is used to indicate exactly how far out of synch the receiving unit's local time base is with respect to the universal time base maintained by the satellites. In this manner, the receiving unit can determine a correction factor that, when applied to the pseudo-ranges, results in a more precise location solution. Additionally, by applying the correction factor to the local time base, the receiving unit can, at least for a period of time, serve as an accurate time reference relative to the universal time base.

This same concept may be readily applied to two-dimensional problems as well, e.g., land mobile radio communication systems where altitude measurements are of lesser importance. However, the same difficulty regarding synchronized time bases is also present in two-dimensional applications. It is known in the art to provide a common time base among fixed transceivers in a land mobile radio system. Indeed, such a common time base is often provided through the use of GPS receivers, described above. Additionally, as GPS receivers become increasingly less expensive, they may be more readily incorporated into mobile and portable units. Future developments may also provide for highly accurate time synchronization between fixed transmitters and mobile units. As such, a need exists for a method which incorporates the advantages of a common time base into a WLS location solution.

DESCRIPTION OF A PREFERRED EMBODIMENT

The present invention provides a method for estimating a location of a mobile unit in a wireless communication system using a common time base between the mobile unit and fixed transceivers. In one embodiment, signals are transmitted by at least two fixed transceivers, each of the signals including a time of transmission indication generated by a corresponding fixed transceiver. When the signals are received by a mobile unit, a time of reception indication relative to the common time base is calculated for each signal. Pseudo-ranges corresponding to each signal are calculated based on their respective time of transmission and time of reception indications. Subsequently, a WLS solution location estimate is calculated based on the pseudo-ranges thus determined. In a second embodiment, essentially the same steps are performed relative to inbound signals (i.e., signals transmitted by the mobile unit). Because there is a common time base between the fixed transceivers and the mobile unit, only two or more signals are required to determine the location estimate. In GPS equipped systems, such a method can be advantageously employed to provide location determination when insufficient data is available to provide a GPS-based location.

Figure 1:
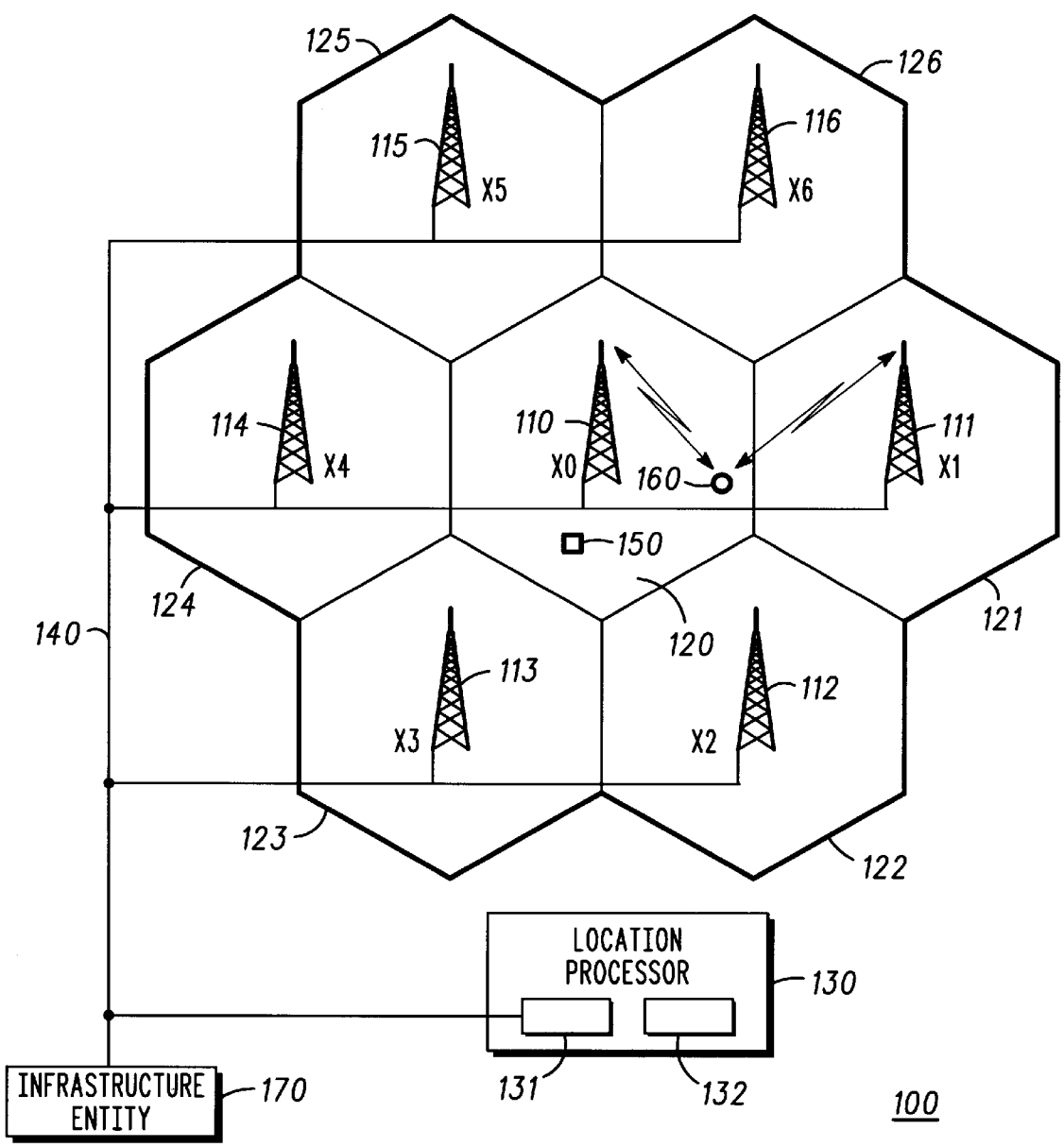
FIG. 1 is a block diagram of a wireless communication system in accordance with the present invention.

The present invention can be more readily described with reference to FIGS. 1–5. FIG. 1 is a block diagram of a wireless communication system 100, such as an IDEN™ system manufactured by Motorola, Inc. The wireless communication system 100 comprises geographically-diverse fixed transceivers 110–116 coupled to a location processor 130 via a network 140, and a plurality of mobile units 160 (only one shown). Although not shown in FIG. 1, each fixed transceiver 110–116 and mobile unit 160 includes memory and one or more digital computing devices used to store and execute software programs, as known in the art.

Figure 3:
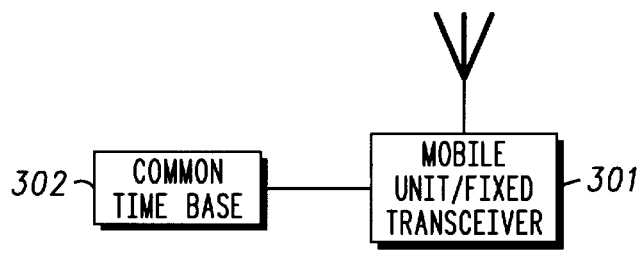
FIG. 3 is a block diagram of a mobile unit or a fixed transceiver in accordance with the present invention.

Additionally, the fixed transceivers 110–116 and the mobile units 160 each have access to a common time base, as illustrated in FIG. 3. As shown in FIG. 3, a given fixed transceiver/mobile unit 301 is coupled directly to a common time base 302, although in practice the common time base may form an integral part of the fixed transceiver/mobile unit 301. In the preferred embodiment, the timing reference provided by each common time base is stable on the order of 100 nanoseconds or less, thereby maintaining accurate time base synchronization throughout the system. A suitable common time base 302 is available using the corrected clock provided by GPS receivers. Of course, if a GPS receiver is available at a mobile unit, location determinations can be readily made without the use of the present invention. However, the present invention may be usefully employed in those situations in which the GPS receiver is unable to provide a location (i.e., the GPS receiver is not able to acquire enough satellite signals for an accurate location determination), but where the timing reference provided by the GPS receiver is still available for use. The reliability of a timing reference provided by a GPS receiver is dependent upon the quality of the local oscillator(s) used to maintain the timing reference. Thus, during periods of GPS unavailability, the length of time during which the timing reference could be reliably used is dependent upon the stability of the local oscillator. However, knowing the stability of the local oscillator, it is possible to determine the maximum period during which the local oscillator may be relied upon to provide an accurate timing reference before additional corrections will be required. Additionally, it may be possible to model the known performance of the local oscillator in order to perform periodic corrections. It is also anticipated that technology could advance to the point where highly stable timing mechanisms requiring only occasional synchronization may become available. Regardless, the availability of the common time base 302 allows both the mobile units and fixed transceivers to reliably compare transmission and reception times for signals transmitted within the system 100.

The coverage area provided by each transceiver 110–116 gives rise to a corresponding cell 120–126, represented by hexagons as shown. In practice, each transceiver 110–116 may actually comprise a bank of transceivers, although it is assumed hereinafter that each cell includes only a single transceiver for simplicity. While a mobile unit roams throughout the system 100, wireless communication services for the mobile unit are managed and provided by a serving site. Neighbor sites are those sites surrounding the current serving site. In the example shown in FIG. 1, the site identified labeled $X_0$ functions as the serving site for the mobile unit 160, and the sites labeled $X_1$–$X_6$ correspond to neighbor sites.

The transceivers 110–116—which in the preferred embodiment provide wireless channels according to a time-division multiplexed (TDM) format—and the location processor 130 collectively are referred to as a fixed infrastructure. Being fixed, the precise location of each transceiver 110–116 is known with high accuracy as determined by surveying or other suitable measurement techniques.

As described below, the present invention relies on signals received or transmitted by a mobile unit. In the preferred embodiment, each of these signals comprise known data symbols unique to each transceiver. For example, in an IDEN™ system, each transceiver will transmit its known data symbols whenever an unused time slot becomes available.

The network 140 allows data and control information to be conveyed between the various infrastructure elements and operates in accordance with well-known network protocols. The fixed infrastructure may also include various other network entities 170 that may serve as the requesters of, or the destination for, location information for a given mobile unit. Examples of such infrastructure entities include, but are not limited to, consoles, telephone interconnect devices, and management terminals.

The location processor 130 includes a digital computing device 131 and memory 132 used for the storage and execution of software programs. In practice, a commercially available computer workstation or a customized computer platform may be used to implement the location processor 130. In the preferred embodiment, the methods described hereinafter are implemented as software programs resident in the location processor 130 and/or mobile units 160.

Figures 2, 4:
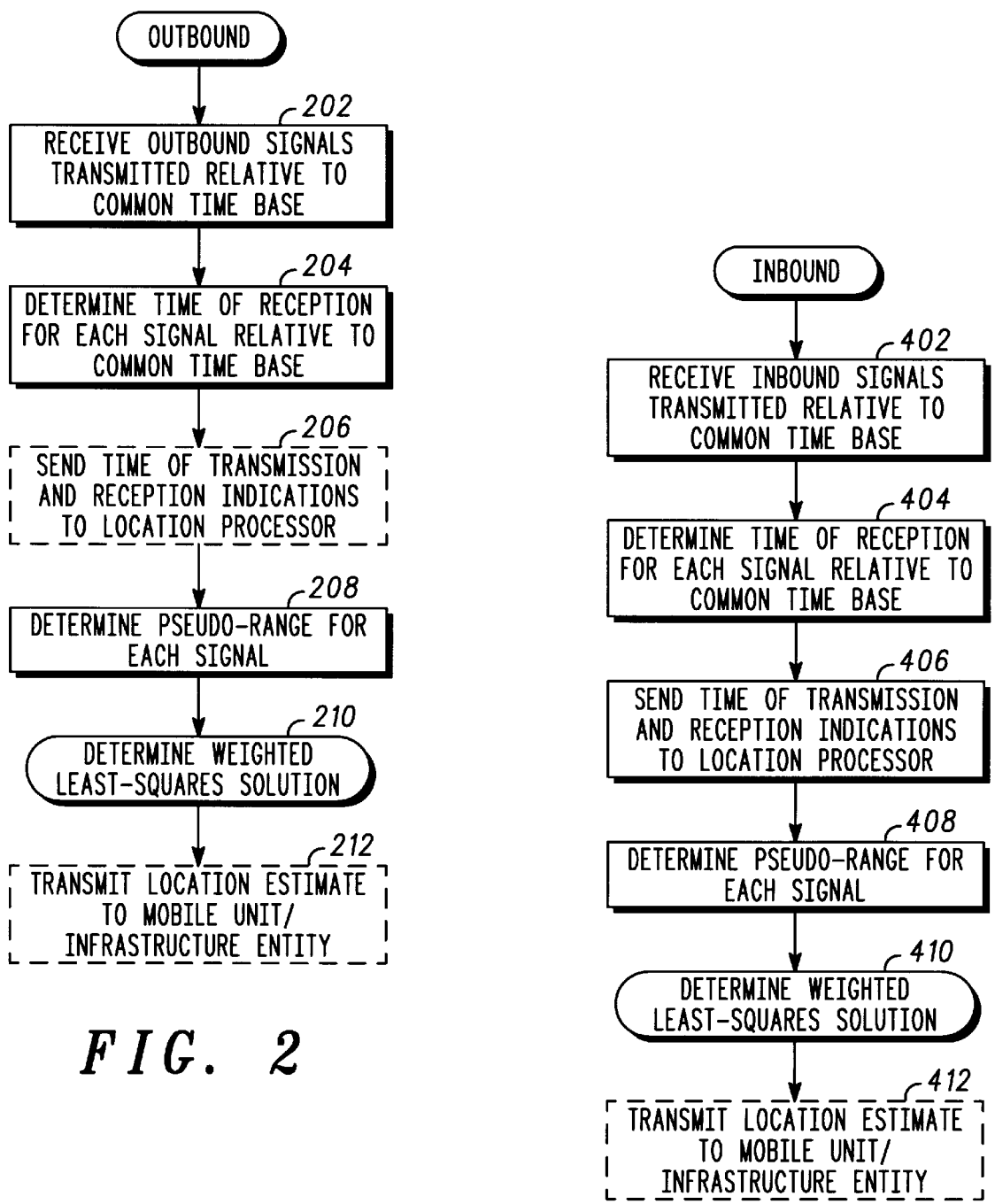
FIG. 2 is a flowchart illustrating a method for determining a location estimate based on outbound signals in accordance with the present invention.
FIG. 4 is a flowchart illustrating a method for determining a location estimate based on inbound signals in accordance with the present invention.

In the preferred embodiment, the location processor of FIG. 1 cooperates with a mobile unit when determining a location for that mobile unit, although it is also possible for the mobile unit to determine its own location without assistance from the location processor. FIG. 2 illustrates a flowchart for determining a location estimate of a mobile unit based on outbound signals (i.e., signals transmitted by fixed transceivers). At step 202, the mobile unit receives signals transmitted by at least two geographically-diverse transceivers. Each of the signals uniquely corresponds to one of the transceivers, and each signal comprises known data symbols transmitted by its corresponding transceiver. Additionally, each of signals received at step 202 includes a time of transmission indication relative to the common time base.

In the preferred embodiment, the time of transmission indication is inherently provided by virtue of the time slot structure in the system. For example, in an IDEN™ system, a structure of sequentially numbered time slots is provided throughout the system. Because all transmitting entities throughout the system (i.e., mobiles and fixed transceivers) have access to the common time base, the integrity of the time slot structure is maintained with high accuracy. Any device wishing to transmit within the system can do so by transmitting during a time slot known to be available for use. Additionally, repetition of the numbering sequence used to identify each of the time slots is on the order of many seconds, effectively eliminating any ambiguity as to when a time slot actually starts. By ascertaining the number of a given received time slot, and given that all time slots are of equal duration, the receiving entity (in this case, a mobile unit) is provided with information regarding when the time slot was transmitted. In effect, the time slot number functions as a time of transmission indication relative to the common time base.

At step 204, the mobile unit determines time of reception indications for each of the signals received at step 202. Because each of the signals comprises a known sequence of symbols unique to each transceiver, a receiving entity (in this case, a mobile unit) performs a running correlation between received symbols (i.e., those symbols that have been demodulated) and the known sequence(s) of symbols. When a high correlation is found, indicating that a known sequence of symbols has been received, the time is noted relative to which slot number(s) provided the relevant symbols. Because the time slot structure is maintained with high accuracy relative to the common time base, the time of reception can be determined. If the time of transmission indication is determined relative to the beginning of the known sequence of symbols, the time of reception indication is also based on when the first symbol of the known sequence of symbols was received. Of course, other symbols within the known sequence of symbols could be used. Also, in order to determine exactly when the relevant symbols were received, compensations can be made to account for the amount of known processing delay in the receiver, e.g., the amount of time necessary to demodulate the symbols and compute the correlations.

At step 206, the mobile unit can optionally send the time of transmission and reception indications to the location processor. In practice, the information sent to the location processor would include identifications of the fixed transceivers that transmitted the signals corresponding to the time of transmission and reception indications.

The delay between when the known data symbols were transmitted and when they were received serve as the basis for determining pseudo-ranges between the mobile unit and each of the transceivers. At step 208, the pseudo-ranges corresponding to each signal received at step 202 is determined. If step 206 was executed, the determination of pseudo-ranges at step 208 is performed by the location processor; if step 206 was not executed, step 208 is performed by the mobile unit. For each signal, the delay time delimited by the time of transmission indication and the time of reception indication (or an average delay time between multiple sets of time of transmission and reception indications for known symbols within a given signal) is determined. Assuming speed of light propagation (and possibly accounting for atmospheric delays or any other known delays), the pseudo-ranges are readily calculated from the delay times thus determined. Referring to the example shown in FIG. 1, the mobile unit 160 is assumed to receive signals from two transceivers, labeled $X_0$ and $X_1$, each transceiver also having associated with it a pseudo-range $D_0$ and $D_1$, respectively. Although the serving site $X_0$ is used in the above example, the neighboring sites alone could just as easily be used.

At step 210, having determined pseudo-ranges for each signal, either the location processor (if step 206 was executed) or the mobile unit (if step 206 was not executed) determines a WLS solution to the equation:

$$\underline{V}\vec{\Delta}_D = \underline{V}\underline{C}\vec{\Delta}_{xy}$$

The components of the above equation and the steps for determining the WLS location solution are further described with reference to FIG. 5 below. The result of determining the WLS location solution is a location estimate for the given mobile unit. At step 212, the location estimate is optionally sent to a mobile unit or infrastructure entity. That is, if the mobile unit performs step 210, the resulting location estimate can be sent to an infrastructure entity (or even the location processor) that may have requested the location information. Alternatively, if the location processor performs step 210, the location estimate can be sent to the mobile unit that performed steps 202–206, or to a different mobile unit, or to an infrastructure entity. Regardless, the method shown in FIG. 2 allows for reliable location determination based on signals transmitted by two or more fixed transceivers, rather than a minimum of three as required in prior art solutions.

Turning now to FIG. 4, a flowchart for determining a location estimate of a mobile unit based on inbound signals (i.e., signals transmitted by the mobile unit) is shown. At step 402, at least two geographically-diverse transceivers each receive a signal transmitted by a mobile unit. That is, each transceiver receives the same signal, but subject to different error conditions (i.e., fading, interference, etc.) than the other transceivers. For example, referring to FIG. 1, transceivers $X_0$ and $X_1$ receive a signal transmitted by the mobile unit 160. In the preferred embodiment, the signal transmitted by the mobile unit is a sequence of known data symbols equivalent in operation to those transmitted by the transceivers, as described above. Additionally, the received signals at each transceiver include time of transmission indications relative to the common time base in the same manner as described above with respect to step 202.

At step 404, each transceiver from step 402 determines time of reception indications for its corresponding received signals in a similar manner as described above with respect to step 204. At step 406, each transceiver sends its respective time of transmission and reception indications to the location processor. In practice, the information sent to the location processor would include identifications of the fixed transceivers that received the signals corresponding to the time of transmission and reception indications.

At steps 408 and 410, respectively, the location processor calculates the pseudo-ranges corresponding to each of the received signals and determines a WLS solution (described further in FIG. 5 below) to provide the location estimate for the mobile unit. At step 412, the location estimate is optionally sent to a mobile unit (either the mobile unit that transmitted the signals received at step 402 or a different mobile unit) or infrastructure entity.

Figure 5:
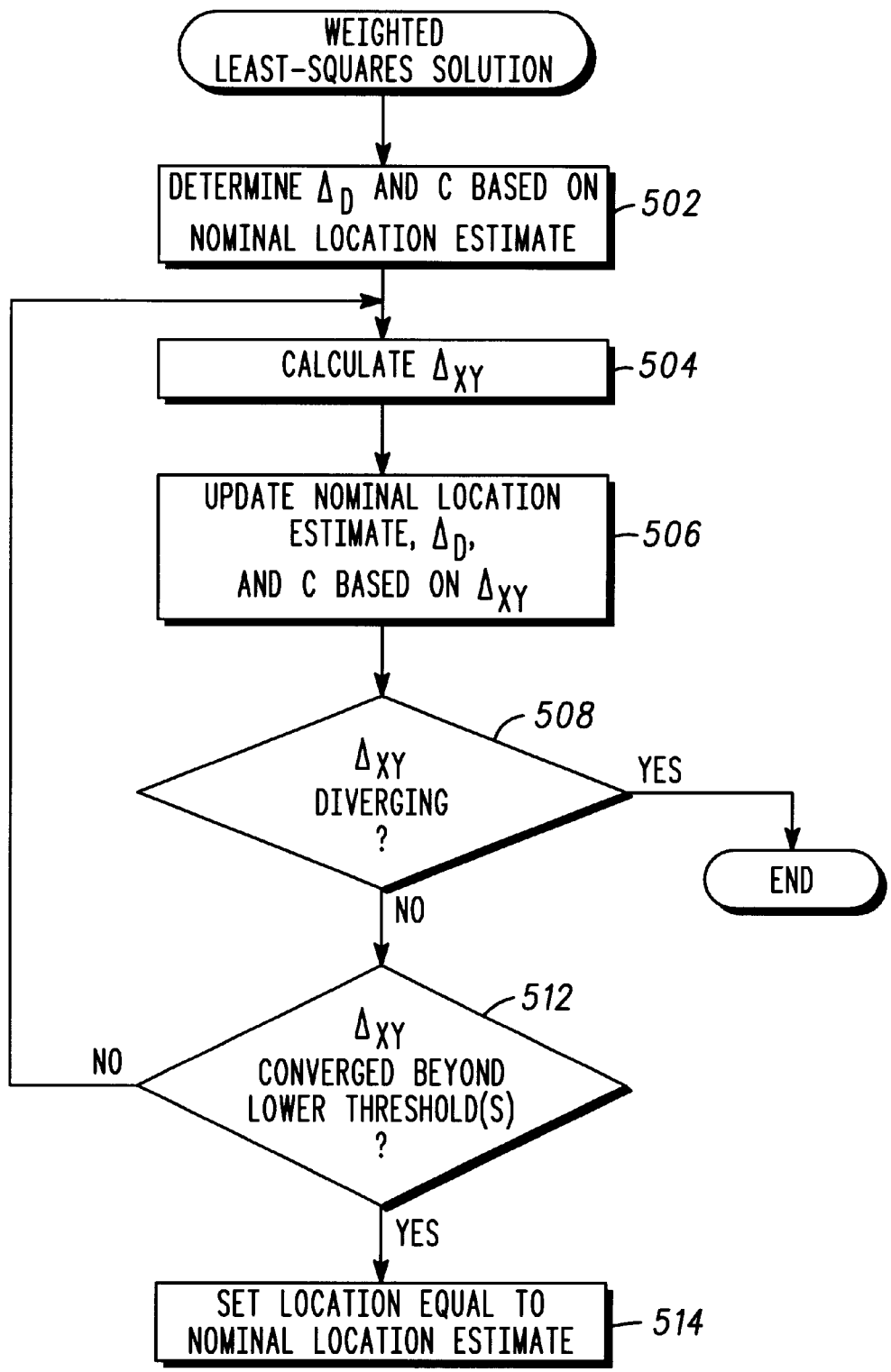
FIG. 5 is a flowchart illustrating the determination of a location estimate using a weighted least squares solution.

FIG. 5 illustrates a method for determining a location estimate using a WLS solution. At step 502, a pseudo-range correction vector $\vec{\Delta}_D$ and a direction cosine matrix $\underline{c}$ are determined based on a nominal location estimate, denoted by the coordinates $(x_n, y_n)$. The initial nominal location estimate is selected to be within the boundaries of a cell corresponding to one of the fixed transceivers transmitting or receiving the signals used in the location determination (preferably the cell corresponding to the serving site), and is also selected based upon the type of cells being used. That is, if the cell is "sectorized", as known in the art, the center of mass of the serving sector is selected as the initial nominal location estimate. However, if the first cell is not sectorized, a good choice for an initial nominal location estimate is a point on a circle centered on, and equal to approximately half the radius of, the cell. Furthermore, knowledge of which neighboring cells are to be used in the location determination may be used to further refine selection of such a point by possibly selecting a point closest to the neighboring cells. An exemplary nominal location estimate 150 is shown in FIG. 1.

Given the initial nominal location estimate, and therefore the known distances $(D_{n,i})$ between the nominal location estimate and the i'th transceiver, the correction values included in $\vec{\Delta}_D$ are calculated as the difference between the measured pseudo-ranges $(D_i)$ and the nominal pseudo-ranges. Thus, for a location determination involving $M \geq 2$ sites, $\vec{\Delta}_D$ is defined as:

$$\vec{\Delta}_D = \begin{bmatrix} D_0 - D_{n,0} \\ \vdots \\ D_i - D_{n,i} \\ \vdots \\ D_{M-1} - D_{n,M-1} \end{bmatrix}$$

The direction cosine matrix $\underline{c}$ includes direction cosines for each of the M sites, and is defined as:

$$C = \begin{bmatrix} c_{xn0} & c_{yn0} \\ \vdots & \vdots \\ c_{nxi} & c_{yni} \\ \vdots & \vdots \\ c_{xnM-1} & c_{ynM-1} \end{bmatrix}$$

Denoting the known location of the i'th neighboring site as $(x_i, y_i)$, the elements of $\underline{c}$ are defined as follows:

$$c_{xni} = \frac{x_n - x_i}{\sqrt{(x_n - x_i)^2 + (y_n - y_i)^2}}$$

$$c_{yni} = \frac{y_n - y_i}{\sqrt{(x_n - x_i)^2 + (y_n - y_i)^2}}$$

Having determined $\vec{\Delta}_D$ and $\underline{c}$, a nominal location correction vector $\vec{\Delta}_{xy}$ can be determined at step 504. The nominal location correction vector contains corrections for the nominal location estimate and is defined as:

$$\vec{\Delta}_{xy} = \begin{bmatrix} \delta_x \\ \delta_y \end{bmatrix}$$

Using linear algebra to solve WLS location solution, the nominal location correction vector is given by the equation:

$$\vec{\Delta}_{xy} = (\underline{C}^T \underline{V}^{-1} \underline{C})^{-1} \underline{C}^T \underline{V}^{-1} \vec{\Delta}_D$$

Where $\underline{v}$ is a weighting matrix which effectively weights each pseudo-range according to its corresponding measurement reliability. Although other techniques for computing $\underline{v}$ are known, a preferred technique is disclosed in U.S. patent application Ser. No. 08/792,331 entitled METHOD AND APPARATUS FOR COVARIANCE MATRIX ESTIMATION IN A WEIGHTED LEAST SQUARES SOLUTION filed Jan. 31, 1997.

At step 506, having solved for the nominal location correction vector, the nominal location estimate is updated by adding $\vec{\Delta}_{xy}$, i.e., $(x_n + \delta_x, y_n + \delta_y)$. With this new nominal location estimate, both the pseudo-range correction vector $\vec{\Delta}_D$ and the direction cosine matrix $\underline{c}$ are also recalculated to reflect the correction to the nominal location estimate. This process of calculating $\vec{\Delta}_D$, $\underline{c}$ and $\vec{\Delta}_{xy}$; updating the nominal location estimate; and re-calculating $\vec{\Delta}_D$, $\underline{c}$ and $\vec{\Delta}_{xy}$ can be iterated until a final solution is reached, as described below.

At step 508, it is determined whether the nominal location correction vector is diverging. This is done by comparing the components of the current nominal location correction vector $(\delta_{x,current}, \delta_{y,current})$ with the components of the previously calculated nominal location correction vector $(\delta_{x,previous}, \delta_{y,previous})$. In particular, divergence is deemed to have occurred when the following conditions are met:

$$\delta_{x,current} > U \cdot \delta_{x,previous}$$
$$\delta_{y,current} > U \cdot \delta_{y,previous}$$

U is an upper threshold having a value greater than unity and, in the preferred embodiment, has a value of 10. It is understood that, rather than a single upper threshold, separate thresholds, $U_x$ and $U_y$, having different values may be used for the separate divergence conditions. If it is determined that divergence has occurred, further iterations of the WLS solution are discontinued, and no location estimate is determined.

If the divergence conditions are not met, it is determined at step 512 whether a magnitude of the nominal location correction vector has converged below a lower threshold, L, as described by the equation:

$$|\vec{\Delta}_{xy}| = \sqrt{\delta_x^2 + \delta_y^2} < L$$

The value of L is a matter of design choice, and in simulations has been set to a value of 8.05 meters (0.005 miles). If the nominal location correction vector has not converged below the lower threshold, processing returns to step 504 where the WLS solution is allowed to iterate another time. However, if the nominal location correction vector has converged, the location estimate is set equivalent to the current nominal location estimate at step 514.

The present invention provides a method for estimating a location of a mobile unit in a wireless communication system using a common time base between the mobile unit and fixed transceivers. Because a common time base is available at both the mobile unit and fixed transceivers, signals from only two or more fixed transceivers are required. Where the common time base is provided by GPS receivers, the present invention may be beneficially employed as an interim location solution for those periods where a GPS location is not available.

Although the present invention has been described in terms of the presently preferred embodiments, it will be readily apparent to those skilled in the art that various modifications can be made therein without departing from the spirit of the present invention or from the scope of the appended claims.

We claim:

1. In a wireless communication system comprising a fixed infrastructure in wireless communication with a mobile unit, the fixed infrastructure further comprising at least two fixed transceivers, a method for estimating a location of the mobile unit, the method comprising steps of:

receiving, by the mobile unit, signals transmitted by each of the at least two fixed transceivers to produce received signals, each of the received signals including a time of transmission indication generated by a respective one of the at least two fixed transceivers relative to a common time base;

determining, by the mobile unit, a time of reception indication relative to the common time base for each of the received signals, wherein the common time base is provided by a continuously corrected local oscillator;

for each of the received signals, determining a pseudo-range based on the respective time of transmission and time of reception indications; and determining a weighted least squares solution using the pseudo-ranges to estimate the location of the mobile unit.

2. The method of claim 1, further comprising a step of:

sending, by the mobile unit, the time of transmission indications and the time of reception indications to a location processor forming part of the fixed infrastructure;

wherein the steps of determining the pseudo-ranges and determining the weighted least squares solution are performed by the location processor.

3. The method of claim 2, further comprising a step of:
   transmitting, by the location processor, the location of the mobile unit to the mobile unit.

4. The method of claim 1, wherein the steps of determining the pseudo-ranges and determining the weighted least squares solution are performed by the mobile unit.

5. The method of claim 4, further comprising a step of:
   transmitting, by the mobile unit, the location of the mobile unit to an infrastructure entity of the fixed infrastructure.

6. The method of claim 1, the step of determining the weighted least squares solution further comprising sub-steps of:
   determining a pseudo-range correction vector $\vec{\Delta}_D$ and a direction cosine matrix $\underline{c}$ based on a nominal location estimate;
   calculating a nominal location correction vector $\vec{\Delta}_{xy}$ according to the equation:

$$\vec{\Delta}_{xy} = (\underline{C}^T \underline{V}^{-1} \underline{C})^{-1} \underline{C}^T \underline{V}^{-1} \vec{\Delta}_D$$

where $\underline{v}$ is a weighting matrix;
   updating the nominal location estimate, the pseudo-range correction vector, and the direction cosine matrix based on the nominal location correction vector; and
   iterating the previous steps of calculating and updating so long as the nominal location correction vector is not diverging and so long as the nominal location correction vector has not converged beyond at least one lower threshold.

7. The method of claim 6, the step of determining the weighted least squares solution further comprising a sub-step of:
   setting the location of the mobile unit equivalent to the nominal location estimate when the nominal location correction vector has converged beyond the at least one lower threshold.

8. The method of claim 6, the step of determining the weighted least squares solution further comprising a sub-step of:
   discontinuing the iteration of the steps of calculating and updating when the nominal location correction vector has diverged beyond at least one upper threshold.

9. In a wireless communication system comprising a fixed infrastructure in wireless communication with a mobile unit, the fixed infrastructure further comprising at least two fixed transceivers in communication with a location processor, a method for estimating a location of the mobile unit, the method comprising steps of:
   receiving, by each of the at least two transceivers, a signal sent by the mobile unit to produce received signals, wherein each of the received signals includes a time of transmission indication generated by the mobile unit based on a local oscillator synchronized relative to a common time base;
   determining, by each of the at least two transceivers, a time of reception indication relative to the common time base for a corresponding one of the received signals;
   for each of the received signals, determining a pseudo-range based on the respective time of transmission and time of reception indications; and
   determining, by the location processor, a weighted least squares solution using the pseudo-ranges to estimate the location of the mobile unit.

10. The method of claim 9, further comprising a step of:
    sending, by the at least two transceivers, the time of transmission indications and the time of reception indications to the location processor;
    wherein the step of determining the pseudo-ranges is performed by the location processor.

11. The method of claim 9, further comprising steps of:
    determining, by each of the at least two transceivers, the pseudo-range for the corresponding one of the received signals; and
    sending, by the at least two transceivers, the pseudo-ranges to the location processor.

12. The method of claim 9, the step of determining the weighted least squares solution further comprising sub-steps of:
    determining a pseudo-range correction vector $\vec{\Delta}_D$ and a direction cosine matrix $\underline{c}$ based on a nominal location estimate;
    calculating a nominal location correction vector $\vec{\Delta}_{xy}$ according to the equation:

$$\vec{\Delta}_{xy} = (\underline{C}^T \underline{V}^{-1} \underline{C})^{-1} \underline{C}^T \underline{V}^{-1} \vec{\Delta}_D$$

where $\underline{v}$ is a weighting matrix;
    updating the nominal location estimate, the pseudo-range correction vector, and the direction cosine matrix based on the nominal location correction vector; and
    iterating the previous steps of calculating and updating so long as the nominal location correction vector is not diverging and so long as the nominal location correction vector has not converged beyond at least one lower threshold.

13. The method of claim 12, the step of determining the weighted least squares solution further comprising a sub-step of:
    setting the location of the mobile unit equivalent to the nominal location estimate when the nominal location correction vector has converged beyond the at least one lower threshold.

14. The method of claim 12, the step of determining the weighted least squares solution further comprising a sub-step of:
    discontinuing the iteration of the steps of calculating and updating when the nominal location correction vector has diverged beyond at least one upper threshold.

15. The method of claim 9, further comprising a step of:
    transmitting, by the location processor, the location of the mobile unit to the mobile unit.

* * * * *